UNITED STATES PATENT OFFICE.

PAUL JULIUS, OF LUDWIGSHAFEN, GERMANY, ASSIGNOR TO BADISCHE ANILIN & SODA FABRIK, OF SAME PLACE.

DISAZO DYE.

SPECIFICATION forming part of Letters Patent No. 677,230, dated June 25, 1901.

Application filed February 25, 1901. Serial No. 48,783. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria and Empire of Germany, have invented new and useful Improvements in Disazo Dyes, of which the following is a specification.

If the nitro-amido-phenol-sulfo-acid to which the constitution

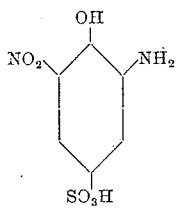

is attributed—that is, the para sulfo-acid of ortho-nitro-ortho-amido-phenol (see Letters Patent granted to me, No. 644,234, dated 27th of February, 1900)—be reduced, the corresponding diamido-phenol-sulfo-acid is obtained. Upon diazotizing this diamido-phenol-sulfo-acid a tetrazo compound results, and I have discovered that this tetrazo compound upon combination first with one of the components hereinafter set forth and then with a second of such components new mixed or unsymmetrical disazo coloring-matters are obtained, possessing excellent qualities. The said components are beta-naphthol, 2.6 beta-naphthol-monosulfo-acid, and beta-hydroxy-naphthoic acid of melting-point 216° centigrade, and the like. The coloring-matters so obtained dye wool from the acid-bath, giving shades which vary from bluish violet to greenish blue, and upon treating the dyed goods with potassium bichromate violet shades become bluer and greenish shades become greener, while all become more intense and assume a great fastness against the action of milling, washing, and light. Further, the shades so obtained do not suffer when the goods are steamed or carbonized.

In the present application I do not desire to claim my new mixed disazo coloring-matter that can be obtained as above defined generically, for the said coloring-matter is generically claimed in a separate application for Letters Patent, Serial No. 48,335, filed February 21, 1901; but what I wish to claim in this application is the specific mixed disazo coloring-matter which can be obtained from one molecular proportion each of beta-hydroxy-naphthoic acid of melting-point 216° centigrade and beta-naphthol.

Although I do not claim the process for the production of the diamido-phenol-sulfo-acid, I give the following example of a method by which it may be obtained for the sake of clearness, the parts being by weight:

Example 1: Dissolve about four hundred and sixty-eight (468) parts of ortho-nitro-ortho-amido-phenol-para-sulfo-acid in two thousand (2,000) parts of hot water. Stir the solution and slowly add about seven hundred and fifty (750) parts of zinc-dust, and subsequently, in small portions at a time, about two thousand (2,000) parts of hydrochloric acid, (containing about thirty-two per cent. of real HCl.) Allow the solution to cool, collect the precipitate, and redissolve it in hydrochloric acid. Filter the solution and neutralize it exactly with carbonate of soda. The desired diamido-phenol-sulfo-acid separates out as free acid in the form of a slightly yellowish crystalline precipitate. Collect by filtering, wash with cold water, and dry carefully.

The following example will serve to illustrate the manner in which my invention may be carried into practical effect and new coloring-matter obtained, the parts being by weight:

Example 2: Prepare a solution of about two hundred and four (204) parts of the diamido-phenol-para-sulfo-acid, obtained as described in the foregoing example, in three thousand (3,000) parts of water containing four hundred and sixty (460) parts of hydrochloric acid, (containing thirty-two per cent. of HCl.) To this solution when cold add gradually one hundred and thirty-eight (138) parts of sodium nitrite dissolved in four hundred (400) parts of water. The tetrazo compound is soon formed and partially separates out. Run the solution or suspension of the tetrazo compound thus obtained into a solution of one hundred and forty-four (144) parts of beta-naphthol and forty (40) parts of solid caustic soda in fifteen hundred (1,500) parts of water. Stir the mixed solutions until combination is complete, which is the case in a short time. The intermediate product obtained separates out as a red precipitate. Filter it off, stir it up into a paste with water, and run it into a solution of two hundred and ten (210) parts of beta-hydroxy-naphthoic acid (which has a melting-point of 216° centigrade) and two hundred (200) parts of carbonate of soda in four thousand five hundred (4,500) parts of water. Warm the solution to a temperature of sixty (60°) degrees centigrade and stir until combination is complete. The new coloring-matter separates out. Filter it off, press, and dry.

My new coloring-matter thus obtained is soluble in water, giving a blue solution which when very dilute is violet-red. Upon the addition of caustic soda to the blue solution a dark-blue precipitate is formed. If hydrochloric acid be added to the blue aqueous solution, a red precipitate is formed, and the solution of the coloring-matter in concentrated sulfuric acid is violet. The coloring-matter can readily be reduced, for instance, with stannous chlorid in hydrochloric-acid solution, with zinc-dust and ammonia, or with other suitable reducing agents. When suitably reduced, three reduction products—namely, the above-mentioned diamido-phenol-sulfo-acid, amido-beta-hydroxy-naphthoic acid, and amido-naphthol—are produced and can be recognized.

Now what I claim is—

The new disazo coloring-matter which can be obtained from diamido-phenol-sulfo-acid, beta-naphthol and beta-hydroxy-naphthoic acid which is soluble in water giving a blue solution which when very dilute is violet-red, in which blue solution a dark-blue precipitate is formed by the addition of caustic soda, and a red precipitate by the addition of hydrochloric acid and which dissolves in concentrated sulfuric acid the solution being violet, and which upon suitable reduction yields diamido-phenol-sulfo-acid, amido-beta-hydroxy-naphthoic acid, and amido-naphthol, substantially as described.

In testimony whereof I have hereunto set my hand in the presence of two subscribing witnesses.

PAUL JULIUS.

Witnesses:
 PAUL SEIDEL,
 JOHN L. HEINKE.